US010353738B2

(12) United States Patent
Bogdany et al.

(10) Patent No.: US 10,353,738 B2
(45) Date of Patent: Jul. 16, 2019

(54) RESOURCE ALLOCATION BASED ON SOCIAL NETWORKING TRENDS IN A NETWORKED COMPUTING ENVIRONMENT

(75) Inventors: Richard J. Bogdany, Durham, NC (US); Thomas B. Harrison, Holly Springs, NC (US); Brian M. O'Connell, Research Triangle Park, NC (US); Herbert D. Pearthree, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 13/425,509

(22) Filed: Mar. 21, 2012

(65) Prior Publication Data

US 2013/0254374 A1    Sep. 26, 2013

(51) Int. Cl.
*G06F 15/16* (2006.01)
*G06F 9/50* (2006.01)
*G06Q 50/00* (2012.01)

(52) U.S. Cl.
CPC .............. *G06F 9/50* (2013.01); *G06Q 50/01* (2013.01)

(58) Field of Classification Search
CPC ....................................................... G06F 9/50
USPC ....................................................... 709/224
See application file for complete search history.

(56) References Cited

U.S. PATENT DOCUMENTS

| 5,093,912 A | 3/1992 | Dong et al. |
| 5,317,726 A | 5/1994 | Horst |
| 6,006,223 A | 12/1999 | Agrawal et al. |
| 6,076,133 A | 6/2000 | Brainard et al. |
| 6,115,640 A | 9/2000 | Tarumi |

(Continued)

FOREIGN PATENT DOCUMENTS

| CN | 101290583 A | 10/2008 |
| CN | 101894047 A | 11/2010 |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Hamza N Algibhah
(74) *Attorney, Agent, or Firm* — William H. Hartwell; Hunter E. Webb; Keohane & D'Alessandro PLLC

(57) ABSTRACT

Embodiments of the present invention provide an approach for allocating computing resources based on social networking/media trends in a networked computing environment (e.g., a cloud computing environment). In a typical embodiment, a baseline computing resource allocation will be determined for the networked computing environment based upon historical computing resource data (e.g., stored in at least one computer storage device). Social networking trend data corresponding to usage of a set of social networking websites may be received and analyzed to determine a forecasted computing resource allocation (e.g., based on social networking trends). The baseline computing resource allocation may be compared to the forecasted computing resource allocation to identify any difference therebetween. A computing resource allocation protocol/plan may then be determined based on the comparison (e.g., to address the difference).

22 Claims, 5 Drawing Sheets

(56) References Cited

U.S. PATENT DOCUMENTS

| | | |
|---|---|---|
| 6,374,227 B1 | 4/2002 | Ye |
| 6,577,323 B1 | 6/2003 | Jamieson et al. |
| 6,625,577 B1 | 9/2003 | Jameson |
| 6,792,399 B1 * | 9/2004 | Phillips ................. G06Q 10/06 705/36 R |
| 6,856,845 B2 | 2/2005 | Fromherz et al. |
| 6,876,988 B2 * | 4/2005 | Helsper ............... G06F 11/3447 706/21 |
| 6,966,033 B1 | 11/2005 | Gasser et al. |
| 7,146,416 B1 * | 12/2006 | Yoo ................... G06F 17/30867 707/E17.119 |
| 7,280,988 B2 * | 10/2007 | Helsper ............... G06F 11/3006 702/182 |
| 7,369,981 B1 * | 5/2008 | Saghier ............... G06F 11/3409 702/179 |
| 7,516,457 B2 | 4/2009 | Eilam et al. |
| 7,558,864 B2 | 7/2009 | Kalantar et al. |
| 7,577,722 B1 | 8/2009 | Khandekar et al. |
| 7,636,764 B1 | 12/2009 | Fein et al. |
| 7,636,779 B2 | 12/2009 | Hayashi et al. |
| 7,680,770 B1 | 3/2010 | Buyokkokten et al. |
| 7,809,831 B2 | 10/2010 | Matsumitsu et al. |
| 7,817,794 B2 | 10/2010 | Galvin |
| 8,024,433 B2 | 9/2011 | Mason et al. |
| 8,069,161 B2 | 11/2011 | Bugir et al. |
| 8,135,795 B2 | 3/2012 | Birkestrand et al. |
| 8,171,485 B2 | 5/2012 | Muller |
| 8,180,922 B2 | 5/2012 | Dini et al. |
| 8,286,183 B2 | 10/2012 | Baird et al. |
| 8,463,902 B2 | 6/2013 | Shafiee et al. |
| 8,533,103 B1 | 9/2013 | Certain et al. |
| 8,682,723 B2 * | 3/2014 | Parsons ............. G06F 17/30864 705/14.52 |
| 8,825,862 B2 | 9/2014 | Anderson et al. |
| 8,826,289 B2 | 9/2014 | Muller |
| 8,856,146 B2 * | 10/2014 | Dempski ........... G06F 17/30864 705/319 |
| 8,954,586 B2 | 2/2015 | Anderson et al. |
| 9,038,063 B2 | 5/2015 | Anderson et al. |
| 2001/0034637 A1 * | 10/2001 | Lin ........................ G06Q 10/04 709/229 |
| 2002/0049687 A1 * | 4/2002 | Helsper ............... G06F 11/3447 706/45 |
| 2002/0165892 A1 | 11/2002 | Grumann et al. |
| 2003/0036890 A1 * | 2/2003 | Billet ...................... G06Q 10/04 703/2 |
| 2003/0167405 A1 | 9/2003 | Freund et al. |
| 2004/0030882 A1 | 2/2004 | Forman |
| 2006/0143359 A1 | 6/2006 | Dostert et al. |
| 2006/0159014 A1 | 7/2006 | Breiter et al. |
| 2006/0167984 A1 | 7/2006 | Fellenstein et al. |
| 2006/0225079 A1 | 10/2006 | Nayak et al. |
| 2007/0214455 A1 | 9/2007 | Williams et al. |
| 2007/0294676 A1 | 12/2007 | Mellor et al. |
| 2008/0059972 A1 | 3/2008 | Ding et al. |
| 2008/0201711 A1 | 8/2008 | Amir |
| 2008/0244579 A1 | 10/2008 | Muller |
| 2008/0263553 A1 | 10/2008 | Lueck et al. |
| 2009/0030927 A1 * | 1/2009 | Cases ................. G06Q 10/06311 |
| 2009/0037421 A1 * | 2/2009 | Gamble ............ G06F 17/30864 |
| 2009/0276228 A1 | 11/2009 | Isaacson |
| 2009/0276771 A1 | 11/2009 | Nickolov et al. |
| 2009/0282404 A1 | 11/2009 | Khandekar et al. |
| 2009/0288084 A1 | 11/2009 | Asete et al. |
| 2009/0300210 A1 | 12/2009 | Ferris |
| 2009/0327471 A1 | 12/2009 | Astete et al. |
| 2010/0057913 A1 | 3/2010 | DeHaan |
| 2010/0058328 A1 | 3/2010 | DeHaan |
| 2010/0058349 A1 | 3/2010 | Diwakar et al. |
| 2010/0131385 A1 | 5/2010 | Harrang et al. |
| 2010/0138830 A1 | 6/2010 | Astete et al. |
| 2010/0180272 A1 | 7/2010 | Kettler et al. |
| 2010/0198609 A1 * | 8/2010 | Mellin .................. G06Q 10/06 705/2 |
| 2010/0199285 A1 | 8/2010 | Medovich |
| 2010/0269109 A1 | 10/2010 | Cartales |
| 2010/0274890 A1 | 10/2010 | Patel et al. |
| 2010/0287281 A1 * | 11/2010 | Tirpak ........................ 709/226 |
| 2010/0325191 A1 | 12/2010 | Jung et al. |
| 2011/0029636 A1 * | 2/2011 | Smyth ................. G06F 17/3089 709/217 |
| 2011/0029672 A1 | 2/2011 | Agneeswaran |
| 2011/0072138 A1 | 3/2011 | Canturk et al. |
| 2011/0072505 A1 | 3/2011 | Ott |
| 2011/0093596 A1 * | 4/2011 | Zimmet ................ G06F 9/5061 709/226 |
| 2011/0138047 A1 | 6/2011 | Brown et al. |
| 2011/0145153 A1 | 6/2011 | Dawson et al. |
| 2011/0145392 A1 | 6/2011 | Dawson et al. |
| 2011/0202925 A1 | 8/2011 | Banerjee et al. |
| 2011/0238674 A1 * | 9/2011 | Avner ............... G06F 17/30734 707/748 |
| 2011/0246596 A1 | 10/2011 | Cao et al. |
| 2011/0270678 A1 * | 11/2011 | Drummond ........... G06Q 30/02 705/14.52 |
| 2011/0276513 A1 * | 11/2011 | Erhart ............... G06F 17/30539 705/347 |
| 2011/0313842 A1 * | 12/2011 | Avner ................ G06Q 30/0241 705/14.41 |
| 2011/0314485 A1 * | 12/2011 | Abed ................ G06F 17/30796 725/14 |
| 2012/0042061 A1 | 2/2012 | Ayala et al. |
| 2012/0053994 A1 * | 3/2012 | Cowan ............... G06Q 10/0639 705/7.38 |
| 2012/0096158 A1 | 4/2012 | Astete et al. |
| 2012/0130940 A1 * | 5/2012 | Gattani ............. G06F 17/30592 707/600 |
| 2012/0131105 A1 * | 5/2012 | Rortvedt ................ G06Q 50/01 709/205 |
| 2012/0131139 A1 * | 5/2012 | Siripurapu .............. H04L 65/60 709/217 |
| 2012/0137002 A1 | 5/2012 | Ferris et al. |
| 2012/0173580 A1 * | 7/2012 | Diorio ................ G06Q 30/0201 707/781 |
| 2012/0197750 A1 * | 8/2012 | Batra ................ G06F 17/30592 705/26.7 |
| 2012/0303406 A1 * | 11/2012 | Srinivas ................ G06Q 10/06 705/7.22 |
| 2012/0316916 A1 * | 12/2012 | Andrews ................ G06Q 40/08 705/7.28 |
| 2013/0014223 A1 * | 1/2013 | Bhatia .................. H04N 21/252 726/4 |
| 2013/0024507 A1 * | 1/2013 | Lifshits ........................ 709/204 |
| 2013/0061221 A1 | 3/2013 | Anderson et al. |
| 2013/0143669 A1 * | 6/2013 | Muller ........................ 463/42 |
| 2013/0159375 A1 | 6/2013 | Perry et al. |
| 2013/0159501 A1 * | 6/2013 | Meier et al. .................. 709/224 |
| 2013/0166621 A1 * | 6/2013 | Zhu ............................ 709/201 |
| 2013/0185729 A1 * | 7/2013 | Vasic et al. .................. 718/104 |
| 2013/0191542 A1 * | 7/2013 | Matczynski et al. ......... 709/226 |
| 2013/0205027 A1 * | 8/2013 | Abuelsaad ............ G06F 9/5072 709/226 |
| 2013/0238805 A1 * | 9/2013 | Catrein et al. ................ 709/226 |

FOREIGN PATENT DOCUMENTS

| | | |
|---|---|---|
| EP | 0362107 A2 | 4/1990 |
| WO | 2009108344 A1 | 9/2009 |
| WO | 2012087104 A1 | 6/2012 |

OTHER PUBLICATIONS

Mell et al., "The NIST Definition of Cloud Computing", National Institute of Standards and Technology, Information Technology Laboratory, Version 15, Oct. 7, 2009, 2 pages.

Pant, P., "Provisioning in the Cloud with Point-and-Click Simplicity Using Your Existing Data Center Tools", cloudswitch.com/blog/tag/new, Jan. 11, 2011, 4 pages.

(56) References Cited

OTHER PUBLICATIONS

Zhu, J. et al., "Twinkle: A Fast Resource Provisioning Mechanism for Internet Services," Zhenxiao.com, pp. 1-9. No publication date cited.
U.S. Appl. No. 13/227,261, Office Action, dated Nov. 21, 2012, 15 pages.
U.S. Appl. No. 13/227,261, Office Action, dated Jan. 16, 2014, 20 pages.
U.S. Appl. No. 13/227,261, Office Action, dated Jun. 5, 2014, 14 pages.
U.S. Appl. No. 13/227,261, Office Action, dated Feb. 28, 2013, 17 pages.
U.S. Appl. No. 13/181,646, Office Action, dated Dec. 13, 2012, 17 pages.
U.S. Appl. No. 13/181,646, Office Action, dated Jun. 23, 2014, 12 pages.
U.S. Appl. No. 13/181,646, Office Action, dated Jul. 25, 2014, 14 pages.
U.S. Appl. No. 13/181,646, Office Action, dated Jun. 25, 2013, 17 pages.
U.S. Appl. No. 13/220,879, Office Action, dated Apr. 15, 2013, 51 pages.
U.S. Appl. No. 13/220,879, Office Action, dated Oct. 25, 2013, 37 pages.
U.S. Appl. No. 13/214,454, Office Action, dated Mar. 28, 2014, 32 pages.
U.S. Appl. No. 13/214,454, Office Action, dated Apr. 2, 2013, 40 pages.
U.S. Appl. No. 13/214,454, Office Action, dated Oct. 21, 2013, 33 pages.
Ravid, "Practical Statistics for Educators", Oct. 2010, Rowman & Littlefield Publishers, Inc., 26 pages.
U.S. Appl. No. 13/195,326, Office Action, dated Jul. 3, 2013, 22 pages.
U.S. Appl. No. 13/195,326, Notice of Allowance, dated Apr. 24, 2014, 28 pages.
Xu et al., "Multi-objective Virtual Machine Placement in Virtualized Data Center Environments", 2010 IEEE/ACM International Conference on Green Computing and Communications & 2010 IEEE/ACM International Conference on Cyber, Physical and Social Computing, Apr. 2010, pp. 179-188.
U.S. Appl. No. 13/214,454, Office Action Communication, dated Dec. 22, 2014, 33 pages.
U.S. Appl. No. 13/220,879 Office Action Communication, dated Nov. 7, 2014, 31 pages.
Kim, U.S. Appl. No. 14/644,462, Notice of Allowance dated Jan. 21, 2016, 17 pages.
Maitland, J., "Keeping Control Isn't Easy", Chapter 4: Cloud-Based Infrastructure, SearchCloudComputing.com, Publication Date: Oct. 2009, 19 pages.
Zhu, J. et al., "Twinkle: A Fast Resource Provisioning Mechanism for Internet Services," Zhenxiao.com, Infocom, 2011 Proceedings IEEE, pp. 1-9.
Application No. GB1210253.9, Combined Search Report and Examination Report, dated Oct. 10, 2012, 5 pages.
Chieu et al., "Dynamic Scaling of Web Applications in a Virtualized Cloud Computing Environment", 2009 IEEE International Conference on e-Business Enginnering, 6 pages.
U.S. Appl. No. 13/220,879, Final Office Action, dated Oct. 25, 2013, 37 pages.
U.S. Appl. No. 13/220,879, Office Action, dated Mar. 28, 2014, 36 pages.
U.S. Appl. No. 13/220,879, Office Action, dated Mar. 25, 2015, 28 pages.
U.S. Appl. No. 13/181,646, Notice of Allowance, dated Sep. 30, 2014, 12 pages.
U.S. Appl. No. 14/520,851, Office Action dated Jun. 25, 2015, 14 pages.
U.S. Appl. No. 13/214,454, Notice of Allowance dated Jul. 10, 2015, 9 pages.
U.S. Appl. No. 13/220,879, Notice of Allowance dated Sep. 28, 2015, 29 pages.
Alfred, U.S. Appl. No. 14/950,173, Notice of Allowance dated Jun. 22, 2016, 12 pages.

\* cited by examiner

RESOURCE ALLOCATION BASED ON SOCIAL NETWORKING TRENDS IN A NETWORKED COMPUTING ENVIRONMENT

INCORPORATION BY REFERENCE

This application hereby incorporates by reference the following co-pending and commonly owned patent applications in their entirety:

U.S. application Ser. No. 13/227,261, entitled "DETERMINING VIRTUAL MACHINE IMAGE PATTERN DISTRIBUTIONS IN A NETWORKED COMPUTING ENVIRONMENT," filed on Sep. 7, 2011;

U.S. application Ser. No. 13/214,454, entitled "PROVISIONING OF VIRTUAL MACHINE POOLS BASED ON HISTORICAL DATA IN A NETWORKED COMPUTING ENVIRONMENT," filed on Aug. 22, 2011;

U.S. application Ser. No. 13/220,879, entitled "SELECTION OF VIRTUAL MACHINES FROM POOLS OF PREPROVISIONED VIRTUAL MACHINES IN A NETWORKED COMPUTING ENVIRONMENT," filed on Aug. 30, 2011;

U.S. application Ser. No. 13/195,326, entitled "OPTIMIZATION OF RESOURCE PROVISIONING IN A NETWORKED COMPUTING ENVIRONMENT," filed on Aug. 1, 2011; and U.S. application Ser. No. 13/181,646, entitled "PRE-PROVISIONING VIRTUAL MACHINES IN A NETWORKED COMPUTING ENVIRONMENT," filed on Jul. 13, 2011.

TECHNICAL FIELD

In general, embodiments of the present invention relate to computing resource allocation. Specifically, embodiments of the present invention relate to the allocation of computing resources based on social networking trends in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud services may be rendered through dynamic infrastructure provisioning. For example, within a relatively static hardware pool, operating systems and applications may be deployed and reconfigured to meet dynamic customer computational demands. Within a cloud environment's boundaries, images may be installed and overwritten, Internet Protocol (IP) addresses may be modified and real and virtual processors may be allocated to meet changing business needs. Challenges may exist, however, in providing an infrastructure that is capable of modifying its resource allocation plan/protocol in response to changing demands.

SUMMARY

In general, embodiments of the present invention provide an approach for allocating computing resources based on social networking/media trends in a networked computing environment (e.g., a cloud computing environment). In a typical embodiment, a baseline computing resource allocation will be determined for the networked computing environment based upon historical computing resource data (e.g., stored in at least one computer storage device). Social networking trend data corresponding to usage of a set of social networking websites may be received and analyzed to determine a forecasted computing resource allocation (e.g., based on social networking trends). The baseline computing resource allocation may be compared to the forecasted computing resource allocation to identify any difference therebetween. A computing resource allocation protocol/plan may then be determined based on the comparison (e.g., to address the difference).

A first aspect of the present invention provides a computer-implemented method for allocating computing resources based on social networking trends in a networked computing environment, comprising: determining a baseline computing resource allocation for the networked computing environment based upon historical computing resource data stored in at least one computer storage device; receiving social networking trend data corresponding to usage of a set of social networking websites; analyzing the social networking trend data to determine a forecasted computing resource allocation based on social networking trends; comparing the baseline computing resource allocation to the forecasted computing resource allocation; and determining a computing resource allocation protocol based on the comparing.

A second aspect of the present invention provides a system for allocating computing resources based on social networking trends in a networked computing environment, comprising: a memory medium comprising instructions; a bus coupled to the memory medium; and a processor coupled to the bus that when executing the instructions causes the system to: determine a baseline computing resource allocation for the networked computing environment based upon historical computing resource data stored in at least one computer storage device; receive social networking trend data corresponding to usage of a set of social networking websites; analyze the social networking trend data to determine a forecasted computing resource allocation based on social networking trends; compare the baseline computing resource allocation to the forecasted computing resource allocation; and determine a computing resource allocation protocol based on the comparison.

A third aspect of the present invention provides a computer program product for allocating computing resources based on social networking trends in a networked computing environment, the computer program product comprising a computer readable storage media, and program instructions stored on the computer readable storage media, to: determine a baseline computing resource allocation for the networked computing environment based upon historical computing resource data stored in at least one computer storage device; receive social networking trend data corresponding to usage of a set of social networking websites; analyze the social networking trend data to determine a forecasted computing resource allocation based on social networking trends; compare the baseline computing resource allocation to the forecasted computing resource allocation; and determine a computing resource allocation protocol based on the comparison.

A fourth aspect of the present invention provides a method for deploying a system for allocating computing resources based on social networking trends in a networked computing environment, comprising: providing a computer infrastructure being operable to: determine a baseline computing resource allocation for the networked computing environment based upon historical computing resource data stored in at least one computer storage device; receive social networking trend data corresponding to usage of a set of social networking websites; analyze the social networking trend data to determine a forecasted computing resource allocation based on social networking trends; compare the baseline computing resource allocation to the forecasted computing resource allocation; and determine a computing resource allocation protocol based on the comparison.

BRIEF DESCRIPTION OF THE DRAWINGS

These and other features of this invention will be more readily understood from the following detailed description of the various aspects of the invention taken in conjunction with the accompanying drawings in which.

Figure 1:
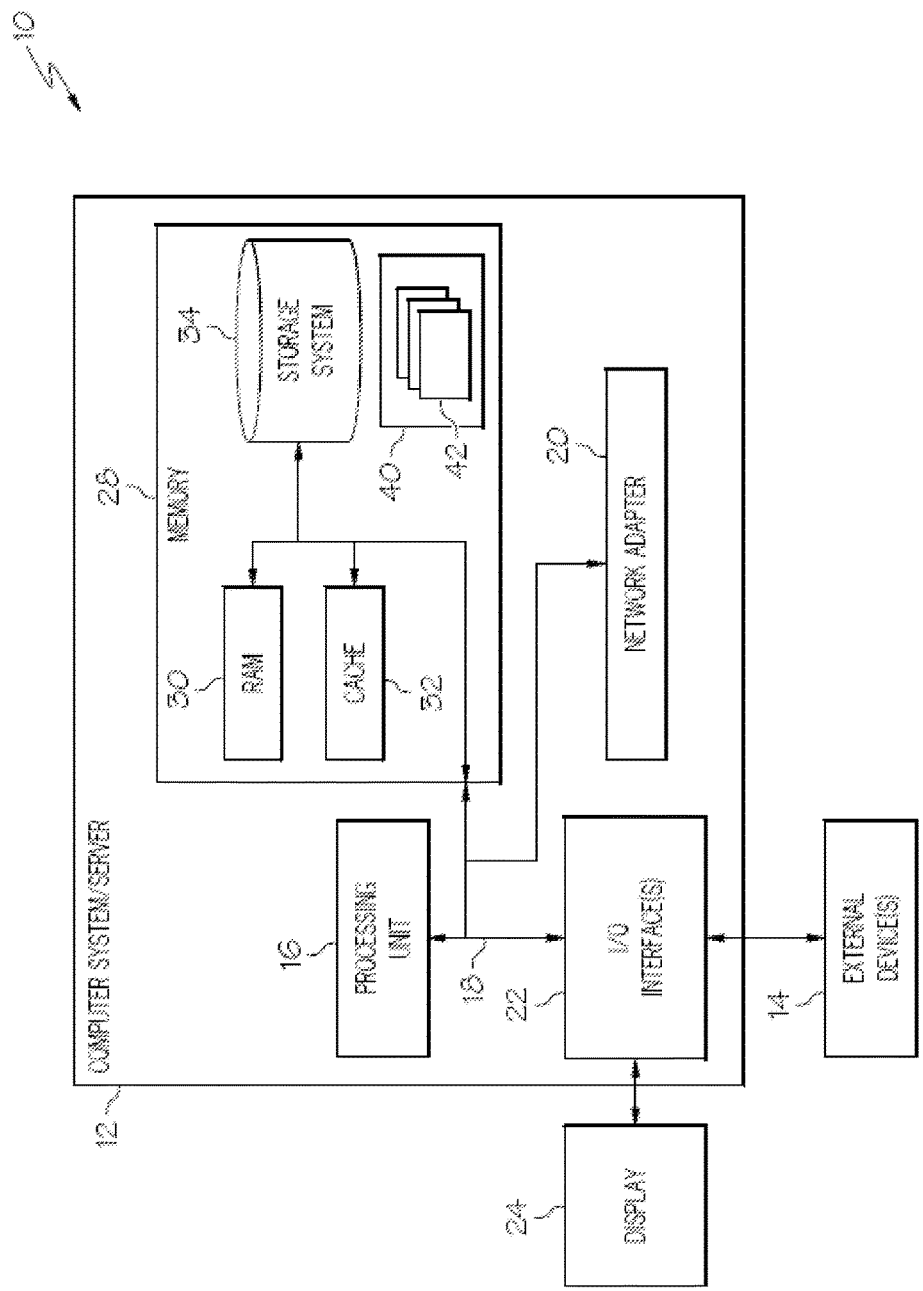
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for allocating computing resources based on social networking/media trends in a networked computing environment (e.g., a cloud computing environment). In a typical embodiment, a baseline computing resource allocation will be determined for the networked computing environment based upon historical computing resource data (e.g., stored in at least one computer storage device). Social networking trend data corresponding to usage of a set of social networking websites may be received and analyzed to determine a forecasted computing resource allocation (e.g., based on social networking trends). The baseline computing resource allocation may be compared to the forecasted computing resource allocation to identify any difference therebetween. A computing resource allocation protocol/plan may then be determined based on the comparison (e.g., to address the difference).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
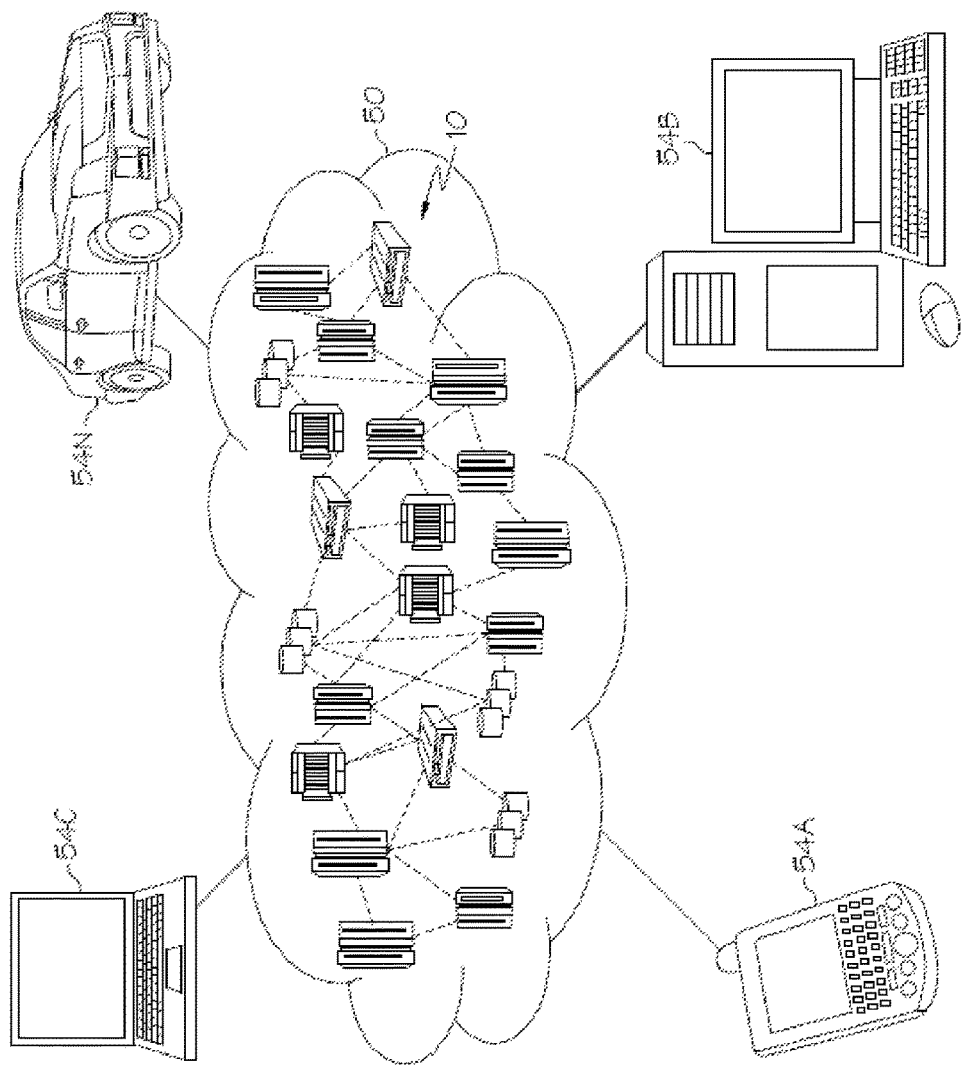
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
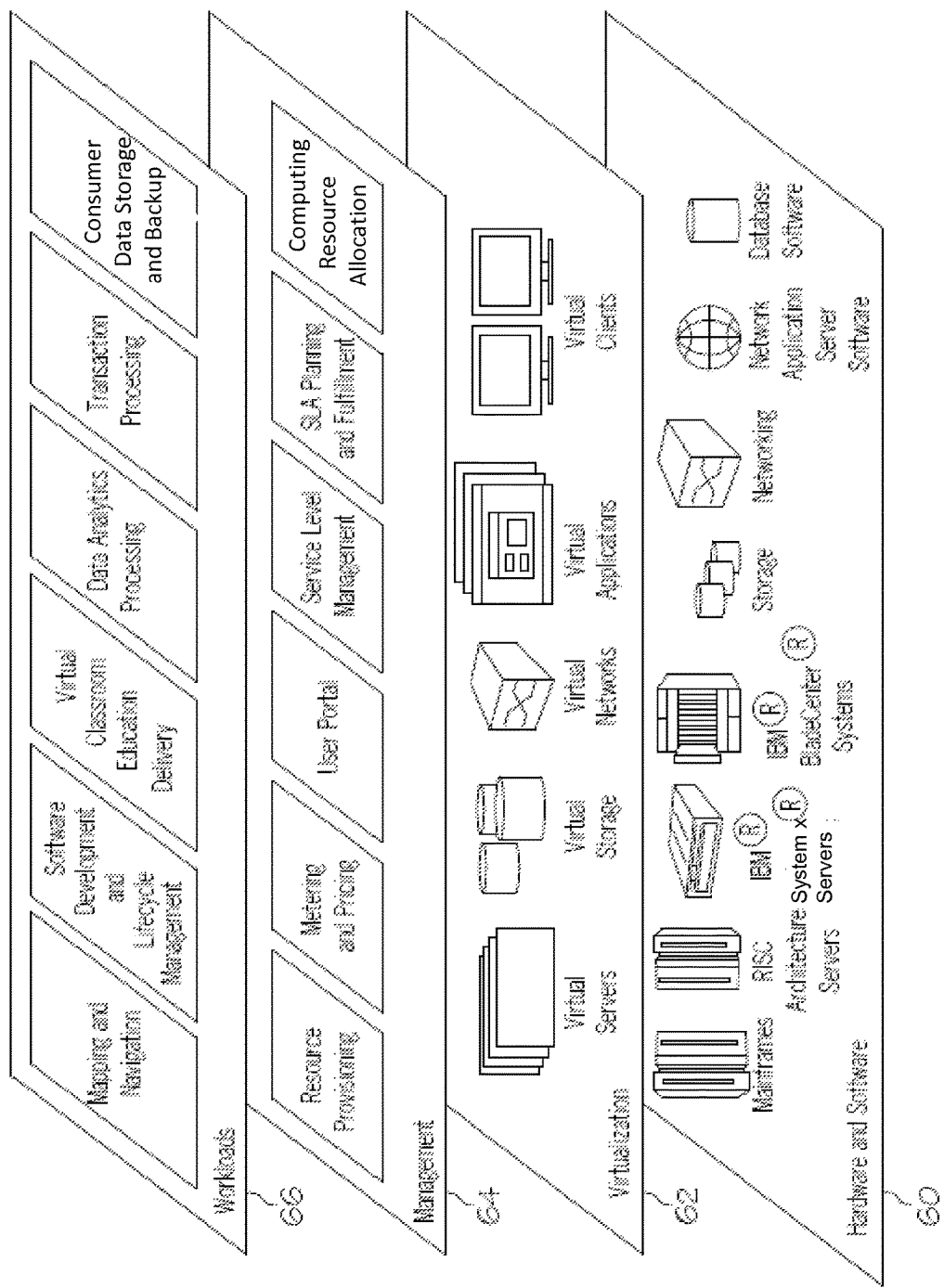
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is computing resource allocation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the computing resource allocation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
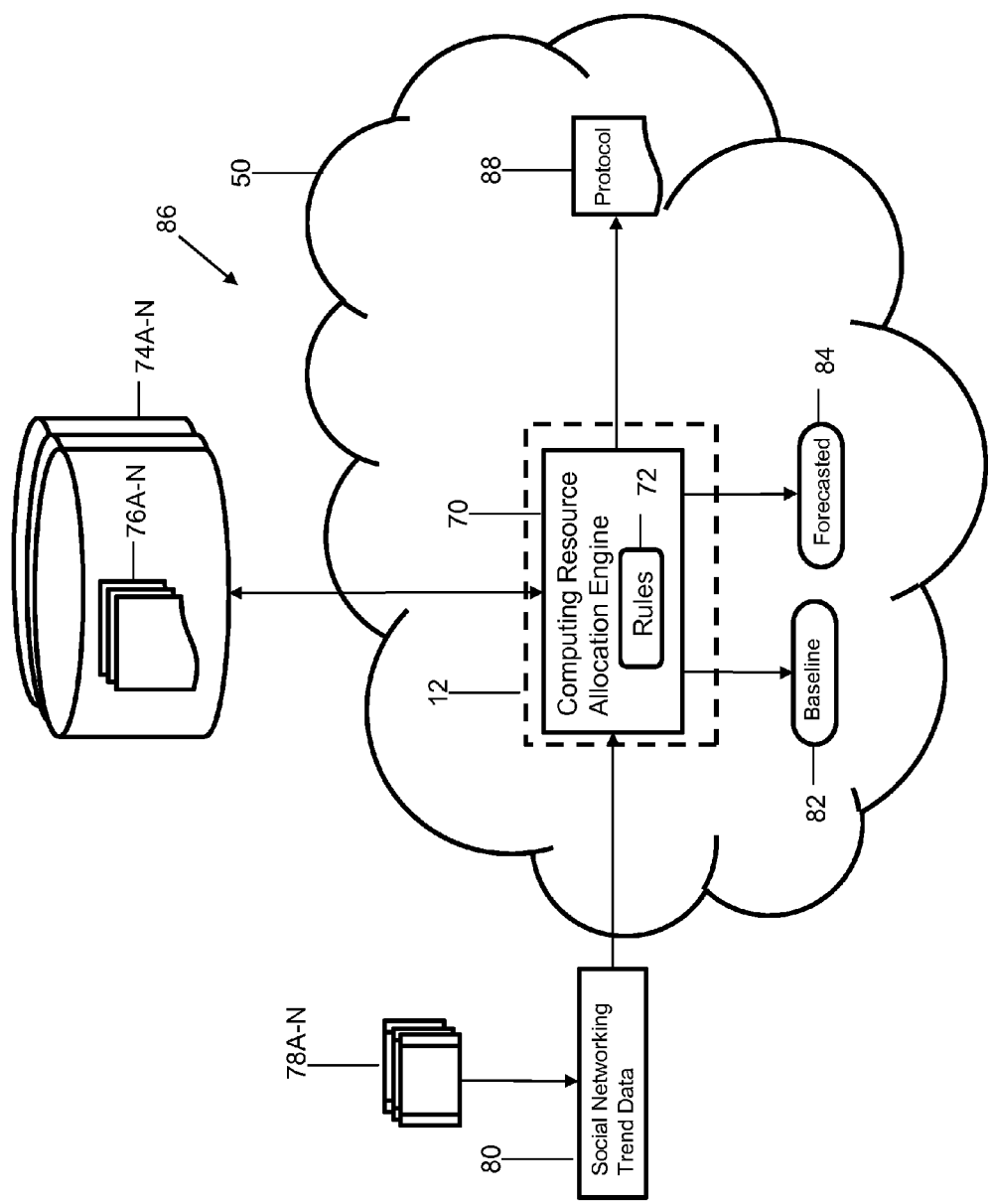
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have a computing resource allocation engine (engine 70). Rather, engine 70 could be loaded on a server or server-capable device that communicates (e.g., wirelessly) with the clients to provide computing resource allocation. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides computing resource allocation hereunder.

Along these lines, engine 70 may perform multiple functions similar to a general-purpose computer. Specifically, among other functions, engine 70 may (among other things): determine a baseline computing resource allocation 82 (e.g., a level of computing resource needed to be an expected/traditional/usual level of traffic in the networked computing environment 50) for the networked computing environment 50 based upon historical computing resource data 76A-N stored in at least one computer storage device 74A-N (e.g., by analyzing analyze historical log(s)); receive social networking trend data 80 corresponding to usage of a set of social networking websites 78A-N; analyze the social networking trend data 80 (e.g., in real-time) to determine a forecasted computing resource allocation 84 based on social networking trends (e.g., identify a set of tags (e.g., hash tags) in the social networking trend data to determine a level of social networking activity); compare the baseline computing resource allocation 82 to the forecasted computing resource allocation 84 (e.g., to identify any difference therebetween); and/or determine a computing resource allocation plan/protocol 88 (e.g., a modification of the baseline computing resource allocation to meet the forecasted computing resource allocation) based on the comparison.

Thus, embodiments of the present invention enable a cloud infrastructure to alter its resource plan and instance count in response to trends in social networking/media. For example, embodiments of the present invention may enable an infrastructure to adapt to changes in social networking traffic as topics become popular that may affect the infrastructure. Specifically, embodiments of the present invention provide just-in-time cloud provisioning through the analysis of social media. This may enable cloud environments to predict required resource allocations, allocate those resources as required, and modify those resource allocations based on trends in social media.

Along these lines, embodiments of the present invention may utilize various analytical measures (e.g., log analysis to mine for commonly or frequently occurring trends, popularity of a given topic, etc.) trends, to determine a baseline computing resource allocation. This baseline computing resource allocation typically indicates appropriate levels of computing resources to serve expected/typical levels of network traffic. For example, in an "events" infrastructure, a baseline computing resource allocation plan/protocol for a tennis tournament may be derived through a historical log analysis that described an impact that various players may have on the infrastructure on specific days of the tournament. For example, the most popular players may have a larger impact on the infrastructure than less popular players. This baseline may used to create a temporally (e.g., hourly) segmented resource allocation plan that the infrastructure may use to increase/decrease infrastructure instance quantities based on expected computing resource demands.

Once a baseline resource allocation has been determined, embodiments of the invention analyze real-time trends in social media to discern if an instance/computing resource allocation plan/protocol should be altered based on changes in social media. In one example, the social network Twitter®, has the concept of messages (e.g., Tweets® ) and followers who receive those messages (Twitter and Tweet and related terms are trademarks of Twitter, Inc. in the United States and/or other countries). Furthermore, users who are sending messages on Twitter can categorize those messages using something called hash tags. Messages containing the same hash tag can be grouped and counted. The system (e.g., engine 70) of embodiments of the present invention may be populated with a set of hash tags, whose level of activity may indicate future or near-term additional resource requirements for the infrastructure. If a number of occurrences of those hash tags within a specified time interval exceed a predefined baseline/threshold, then the computing infrastructure may adjust the number of allocated computing resources. In one embodiment, all matching messages or a subset of users may be scanned to determine how many followers exist for the message sender. This is used to assign a weight to each matching hash tag. For example, the following approach may be used to weight individual messages:

W=weight
F=number of followers
TF=total number of possible followers

Some systems may use a linear relationship with the formula of:

$$W=F/TF$$

Although as mentioned hereinbelow resource demands may, and often do, exhibit non-linear characteristics (e.g., exponential). Once a weight has been calculated for postings, the weighted average then can be calculated using the following algorithm:

$$A=\mathrm{Sum}(W'*P)/D$$

where:
A=average number of messages (e.g., tweets) per time unit
W'=weight of particular user/person,
P'=number of posts by particular user/person
D=duration.

An additional aspect that may be considered is a baseline of postings per time unit that each unit of allocation can handle. This baseline can be determined by analyzing at historical web traffic data and corresponding social networking/media trend averages. A relationship can be established between these two values so that a baseline of postings per time unit can established and used to calculate a relationship in terms of resource allocation units. So, by computing a real-time calculation of the value of A (from the formula above), it can be determined how many resource allocation units are needed to satisfy the corresponding web traffic predicted from that particular social media channel. If a current computing resource allocation protocol/plan is insufficient then additional computing resources (e.g., instances) can be provisioned. Correspondingly, if a current computing resource allocation is excessive, computing resources can be de-provisioned.

It should be also noted that since social networking/media is not the only influence on web traffic, the predictions of the influence from social networking/media may also be utilized in a larger weighted average calculation to take into account the influence's respective overall contribution on workload, an provision/allocate other computing resources accordingly.

Other embodiments may square or cube the number of followers because there may be a non-linear infrastructure impact to the number of followers of a message. In any event, upon detection of an impactful trending topic, the system may proactively increase the number of allocated cloud instances. When a topic's popularity decreases, or the time span in which the topic is applicable expires, the system may decrease a number of computing resources, such that the number of computing resources matches the original computing resource allocation plan/protocol. Thus, embodiments of the present invention allow a baseline computing resource allocation to be compared to a forecasted computing resource allocation to determine if any differences exist. If so, a computing resource allocation protocol/plan may be determined and implemented to address any such difference (e.g., a need to increase or decrease computing resource allocation to meet the forecasted allocation).

Figure 5:
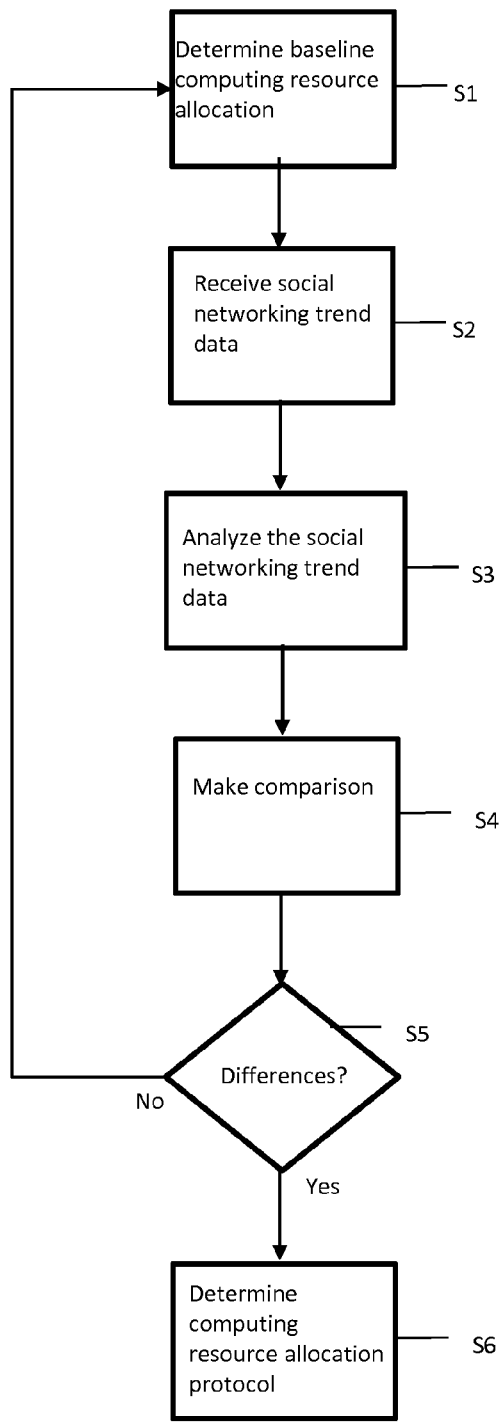
FIG. 5 depicts a method flow diagram according to an embodiment of the present invention.

Referring now to FIG. 5, a method flow diagram according to an embodiment of the present invention is shown. In step S1 a baseline computing resource allocation is determined (e.g., based upon historical computing resource data stored in at least one computer storage device). In step S2, social networking trend data corresponding to usage of a set of social networking websites is received. In step S3, the social networking trend data is analyzed to determine a forecasted computing resource allocation based on social networking trends. In step S4, the baseline computing resource allocation is compared to the forecasted computing resource allocation. In step S5, it is determined whether any differences exist between the baseline computing resource allocation and the forecasted computing resource allocation. If so, a computing resource allocation protocol can be determined to address the difference in step S6. If not, the process can end or return to a previous step (e.g., step S1, step S2, etc.)

While shown and described herein as a computing resource allocation solution, it is understood that the invention further provides various alternative embodiments. For example, in one embodiment, the invention provides a computer-readable/useable medium that includes computer program code to enable a computer infrastructure to provide computing resource allocation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide computing resource allocation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for computing resource allocation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for allocating computing resources based on social networking trends in a networked computing environment, comprising:
receiving publically available topic-based social networking trend data that is external to the networked computing environment and corresponds to usage of a set of social networking websites that are unaffiliated with the networked computing environment;
grouping messages in the publically available topic-based social networking trend data into a plurality of topic groups, each content group of the plurality of topic groups containing only messages having content related to a topic of the content group;
counting a number of messages in a content group to determine a popularity of a specific topic;
determining a baseline computing resource allocation for the networked computing environment based upon a relationship between the social networking trend data over a plurality of time periods and historical computing resource data over the plurality of time periods stored in at least one computer storage device, the baseline computing resource allocation being a temporally segmented resource allocation plan;
analyzing real-time social networking data against the social networking trend data to determine a change in the social networking trends based on a change in the popularity of a specific topic;
determining a forecasted computing resource allocation for the networked computing environment based on an impact of the change in the social networking trends for the specific topic on hardware and software elements of the networked computing environment that are related to the specific topic;
comparing the baseline computing resource allocation to the forecasted computing resource allocation to identify cloud-based hardware and software elements required to reach the forecasted computing resource allocation from the baseline computing resource allocation; and
dynamically altering a computing resource allocation protocol to provision or de-provision the cloud-based hardware and software elements based on the comparing.

2. The computer-implemented method of claim 1, comprising analyzing historical logs of computing resource utilization.

3. The computer-implemented method of claim 1, the baseline computing resource allocation comprising a level of computing resources needed to process an expected level of traffic in the networked computing environment.

4. The computer-implemented method of claim 1, the social network trend data being real-time data.

5. The computer-implemented method of claim 1, the computing resource allocation protocol comprising a modification of the baseline computing resource allocation to meet the forecasted computing resource allocation.

6. The computer-implemented method of claim 1, the analyzing comprising identifying a set of tags, which are related to topics of impact to the networked computing environment, in the social networking trend data and counting a number of the set of tags to determine a level of social networking activity, wherein the set of tags includes at least one hash tag.

7. The computer-implemented method of claim 1, the networked computing environment comprising a cloud computing environment.

8. A system for allocating computing resources based on social networking trends in a networked computing environment, comprising:
a memory medium comprising instructions;
a bus coupled to the memory medium; and
a processor coupled to the bus that when executing the instructions causes the system to:
receive publically available topic-based social networking trend data that is external to the networked computing environment and corresponds to usage of a set of social networking websites that are unaffiliated with the networked computing environment;
group messages in the publically available topic-based social networking trend data into a plurality of topic groups, each content group of the plurality of topic groups containing only messages having content related to a topic of the content group;
count a number of messages in a content group to determine a popularity of a specific topic;
determine a baseline computing resource allocation for the networked computing environment based upon a relationship between the social networking trend data over a plurality of time periods and historical computing resource data over the plurality of time periods stored in at least one computer storage device, the baseline computing resource allocation being a temporally segmented resource allocation plan;
analyze real-time social networking data against the social networking trend data to determine a change in the social networking trends based on a change in the popularity of a specific topic;
determine a forecasted computing resource allocation for the networked computing environment based on an impact of the change in the social networking trends for the specific topic on hardware and software elements of the networked computing environment that are related to the specific topic;
compare the baseline computing resource allocation to the forecasted computing resource allocation to identify cloud-based hardware and software elements required to reach the forecasted computing resource allocation from the baseline computing resource allocation; and
dynamically alter a computing resource allocation protocol to provision or de-provision the cloud-based hardware and software elements based on the comparison.

9. The system of claim 8, the memory medium further comprising instructions for causing the system to analyze historical logs of computing resource utilization.

10. The system of claim 8, the baseline computing resource allocation comprising a level of computing resources needed to process an expected level of traffic in the networked computing environment.

11. The system of claim 8, the social network trend data being real-time data.

12. The system of claim 8, the computing resource allocation protocol comprising a modification of the baseline computing resource allocation to meet the forecasted computing resource allocation.

13. The system of claim 8, the memory medium further comprising instructions for causing the system to identify a set of tags, which are related to topics of impact to the networked computing environment, in the social networking trend data and to count a number of the set of tags to determine a level of social networking activity, wherein the set of tags includes at least one hash tag.

14. The system of claim 8, the networked computing environment comprising a cloud computing environment.

15. A computer program product for allocating computing resources based on social networking trends in a networked computing environment, the computer program product comprising a computer readable storage device, and program instructions stored on the computer readable storage media, to:
receive publically available topic-based social networking trend data that is external to the networked computing environment and corresponds to usage of a set of social networking websites that are unaffiliated with the networked computing environment;
group messages in the publically available topic-based social networking trend data into a plurality of topic groups, each content group of the plurality of topic groups containing only messages having content related to a topic of the content group;
count a number of messages in a content group to determine a popularity of a specific topic;
determine a baseline computing resource allocation for the networked computing environment based upon a relationship between the social networking trend data over a plurality of time periods and historical computing resource data over the plurality of time periods stored in at least one computer storage device, the baseline computing resource allocation being a temporally segmented resource allocation plan;
analyze real-time social networking data against the social networking trend data to determine a change in the social networking trends based on a change in the popularity of a specific topic;
determine a forecasted computing resource allocation for the networked computing environment based on an impact of the change in the social networking trends for the specific topic on hardware and software elements of the networked computing environment that are related to the specific topic;
compare the baseline computing resource allocation to the forecasted computing resource allocation to identify cloud-based hardware and software elements required to reach the forecasted computing resource allocation from the baseline computing resource allocation; and
dynamically alter a computing resource allocation protocol to provision or de-provision the cloud-based hardware and software elements based on the comparison.

16. The computer program product of claim 15, the computer readable storage media further comprising instructions to analyze historical logs of computing resource utilization.

17. The computer program product of claim 15, the baseline computing resource allocation comprising a level of computing resources needed to process an expected level of traffic in the networked computing environment.

18. The computer program product of claim 15, the social network trend data being real-time data.

19. The computer program product of claim 15, the computing resource allocation protocol comprising a modification of the baseline computing resource allocation to meet the forecasted computing resource allocation.

20. The computer program product of claim 15, the computer readable storage media further comprising instructions to identify a set of tags, which are related to topics of impact to the networked computing environment, in the social networking trend data and to count a number of the set of tags to determine a level of social networking activity, wherein the set of tags includes at least one hash tag.

21. The computer program product of claim 15, the networked computing environment comprising a cloud computing environment.

22. A method for deploying a system for allocating computing resources based on social networking trends in a networked computing environment, comprising:
providing a computer infrastructure being operable to:
receive publically available topic-based social networking trend data that is external to the networked computing environment and corresponds to usage of a set of social networking websites that are unaffiliated with the networked computing environment;
group messages in the publically available topic-based social networking trend data into a plurality of topic groups, each content group of the plurality of topic groups containing only messages having content related to a topic of the content group;
count a number of messages in a content group to determine a popularity of a specific topic;
determine a baseline computing resource allocation for the networked computing environment based upon a relationship between the social networking trend data over a plurality of time periods and historical computing resource data over the plurality of time periods stored in at least one computer storage device, the baseline computing resource allocation being a temporally segmented resource allocation plan;
analyze real-time social networking data against the social networking trend data to determine a change in the social networking trends based on a change in the popularity of a specific topic;
determine a forecasted computing resource allocation for the networked computing environment based on an impact of the change in the social networking trends for the specific topic on hardware and software elements of the networked computing environment that are related to the specific topic;
compare the baseline computing resource allocation to the forecasted computing resource allocation to identify cloud-based hardware and software elements required to reach the forecasted computing resource allocation from the baseline computing resource allocation; and
dynamically altering a computing resource allocation protocol to provision or de-provision the cloud-based hardware and software elements based on the comparison.

\* \* \* \* \*